(12) United States Patent
Gautam et al.

(10) Patent No.: US 10,326,730 B2
(45) Date of Patent: Jun. 18, 2019

(54) VERIFICATION OF SERVER NAME IN A PROXY DEVICE FOR CONNECTION REQUESTS MADE USING DOMAIN NAMES

(71) Applicant: Cisco Technology, Inc., San Jose, CA (US)

(72) Inventors: Venkatesh N. Gautam, Sunnyvale, CA (US); Meixing Le, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 218 days.

(21) Appl. No.: 15/193,863

(22) Filed: Jun. 27, 2016

(65) Prior Publication Data

US 2017/0374017 A1    Dec. 28, 2017

(51) Int. Cl.
  *G06F 15/16*    (2006.01)
  *H04L 29/12*    (2006.01)
  *H04L 29/08*    (2006.01)
  *H04L 29/06*    (2006.01)

(52) U.S. Cl.
  CPC ...... *H04L 61/1511* (2013.01); *H04L 61/6068* (2013.01); *H04L 67/02* (2013.01); *H04L 67/2804* (2013.01); *H04L 67/2842* (2013.01); *H04L 63/0281* (2013.01); *H04L 63/1466* (2013.01); *H04L 67/28* (2013.01)

(58) Field of Classification Search
  CPC .......... H04L 61/1511; H04L 29/12066; H04L 61/302; H04L 63/0281; H04L 67/28; H04L 67/2842; H04L 61/6068; H04L 61/2007; H04L 67/02; H04L 63/1466; H04L 63/20
  USPC ...... 709/213, 219, 224, 225, 229; 726/2, 22, 726/23
  See application file for complete search history.

(56) References Cited

U.S. PATENT DOCUMENTS

| | | |
|---|---|---|
| 8,190,879 B2 | 5/2012 | Wang |
| 8,214,635 B2 | 7/2012 | Wang et al. |
| 8,316,429 B2 | 11/2012 | Long et al. |
| 8,327,128 B1 | 12/2012 | Prince et al. |
| 8,473,744 B2 | 6/2013 | Shelest et al. |
| 8,543,805 B2 | 9/2013 | Ovsiannikov |
| 8,549,157 B2 | 10/2013 | Schnellbaecher |
| 8,638,795 B2 | 1/2014 | Jackowski et al. |
| 8,738,902 B2 | 5/2014 | Yoo et al. |
| 9,015,318 B1 * | 4/2015 | Batz .................. H04L 61/1511 709/217 |

(Continued)

*Primary Examiner* — Liang Che A Wang
*Assistant Examiner* — Johnny B Aguiar
(74) *Attorney, Agent, or Firm* — Edell, Shapiro & Finnan, LLC

(57) ABSTRACT

Techniques are presented herein for a proxy device to verify that the server name listed in a connection request message is the name of the server at the IP address listed in the connection request message. The proxy device obtains a domain name server query sent by a client to a domain name server and then obtains a domain name server result that is sent by the domain name server. The proxy device may cache the data of the domain name server result. The proxy device may obtain a connection request message sent by the client seeking a connection with a server, and then compare the connection request message to the cached domain name server result. Finally, the proxy device may apply one or more policies to the connection request message based on the comparison between the connection request message and the domain name server result.

20 Claims, 6 Drawing Sheets

(56) References Cited

U.S. PATENT DOCUMENTS

| | | | |
|---|---|---|---|
| 9,015,469 B2 | 4/2015 | Prince et al. | |
| 9,124,628 B2 | 9/2015 | Shankar et al. | |
| 9,237,168 B2 | 1/2016 | Wang et al. | |
| 2004/0015725 A1 | 1/2004 | Boneh et al. | |
| 2004/0088409 A1* | 5/2004 | Braemer | H04L 63/0209 709/225 |
| 2007/0136801 A1 | 6/2007 | Le et al. | |
| 2008/0028443 A1 | 1/2008 | Adelman et al. | |
| 2008/0126794 A1 | 5/2008 | Wang et al. | |
| 2009/0157708 A1 | 6/2009 | Bandini et al. | |
| 2010/0306816 A1 | 12/2010 | McGrew et al. | |
| 2011/0289581 A1 | 11/2011 | Gourevitch et al. | |
| 2012/0084423 A1* | 4/2012 | McGleenon | H04L 61/1511 709/223 |
| 2012/0284786 A1 | 11/2012 | Somani et al. | |
| 2012/0303808 A1* | 11/2012 | Xie | H04L 63/0236 709/225 |
| 2013/0312054 A1* | 11/2013 | Wang | H04L 63/0236 726/1 |
| 2014/0075553 A1* | 3/2014 | Hansen | H04L 63/14 726/22 |
| 2016/0330171 A1* | 11/2016 | Wood | H04L 29/06 |
| 2017/0171232 A1* | 6/2017 | Graham-Cumming | H04L 63/1416 |
| 2017/0180380 A1* | 6/2017 | Bagasra | H04L 63/101 |

* cited by examiner

```
struct {
    HandshakeType msg_type;
    uint24 length;
    select (HandshakeType) {
        case hello_request:      HelloRequest;
        case client_hello:       ClientHello;
        case server_hello:       ServerHello;
        case certificate:        Certificate;
        case server_key_exchange: ServerKeyExchange;
        case certificate_request: CertificateRequest;
        case server_hello_done:  ServerHelloDone;
        case certificate_verify: CertificateVerify;
        case client_key_exchange: ClientKeyExchange;
        case finished:           Finished;
    } body;
} Handshake;

struct { } HelloRequest;

struct {
    uint32 gmt_unix_time;
    opaque random_bytes[28];
} Random;

opaque SessionID<0..32>;

uint8 CipherSuite[2];

enum { null(0), (255) } CompressionMethod;

struct {
    ProtocolVersion client_version;
    Random random;
    SessionID session_id;
    CipherSuite cipher_suites<2..2^16-2>;
    CompressionMethod compression_methods<1..2^8-1>;
    select (extensions_present) {
        case false:
            struct {};
        case true:
            Extension extensions<0..2^16-1>;
    };
} ClientHello;
```

510 → case server_key_exchange
520 → opaque SessionID
530 → uint8 CipherSuite[2]
540 → enum CompressionMethod
550 → select (extensions_present)

```
struct {
    NameType name_type;
    select (name_type) {
        case host_name: HostName;
    } name;
} ServerName;

enum {
    host_name(0), (255)
} NameType;

opaque HostName<1..2^16-1>;

struct {
    ServerName server_name_list<1..2^16-1>
} ServerNameList;
```

VERIFICATION OF SERVER NAME IN A PROXY DEVICE FOR CONNECTION REQUESTS MADE USING DOMAIN NAMES

TECHNICAL FIELD

The present disclosure relates to verifying server name identifications of connection request messages, and more specifically, matching the server name identification of a connection request message with cached domain name server results and corresponding Internet Protocol addresses.

BACKGROUND

When establishing a connection between a client and a server, the client sends a connection request message to the server setting the security protocols of the connection. The connection request message may contain several different extensions, one of which is the Server Name Identification (SNI) extension as in the case of a Transport Layer Security (TLS) client hello message. The SNI extension identifies the name of the server with which the client is attempting to establish a connection. However, the client is able to set or alter the SNI extension, and this can present network security issues.

BRIEF DESCRIPTION OF THE DRAWINGS

FIG. 5 is the code structure of the example connection request message illustrated in FIG. 4, according to an example embodiment.

DESCRIPTION OF EXAMPLE EMBODIMENTS

Overview

In one embodiment, at a proxy device or process obtains a domain name server query sent by a client to a domain name server and then obtains a domain name server result sent by the domain name server in response to the domain name server query. The proxy device or process caches the domain name server result sent by the domain name server. The proxy device or process then obtains a connection request message sent by the client seeking a connection with a server. Upon receiving the connection request message, the proxy device or process compares the connection request message to the domain name server result. The proxy device or process then applies at least one policy to the connection request message based on the comparison between the connection request message and the domain name server result.

Example Embodiments

Connection request messages from clients attempting to establish a session with a server may include several extensions to the connection request message, including a Server Name Identification (SNI) extension in the case of the Transport Layer Security (TLS) protocol, version 1.2. The server name listed in the SNI extension may be changed or altered by a client without changing the Internet Protocol (IP) address of the server with which the client intends to establish a connection. Proxy devices, such as firewalls, often use the SNI extension of the connection request message to apply security policies to the connection request message. With the server name of the SNI extension able to be manipulated, the proxy device may easily be tricked into applying the wrong policies to the connection request message.

In some instances, the changing of the server name of an SNI extension may be made for malicious intents or purposes. For example, changing the server name of the SNI extension of the connection request message may allow the client of an enterprise network to subvert the security policies of a proxy device to enable malicious traffic to enter the enterprise network through the proxy device without the proxy device detecting that a connection with a blocked server has been established. While the connection request message from a client may include an IP address of a server that would typically be blocked by the proxy device's security policies, the proxy device may allow the connection if the server name or domain name in SNI extension is allowed by the security policies of the proxy device.

It is difficult for the proxy device to apply the proper policies when only analyzing the server name information of the connection request message without decryption. Thus, it is not reliable for proxy devices to only look at and analyze the server name information of a connection request message prior to applying policies.

Figure 1:
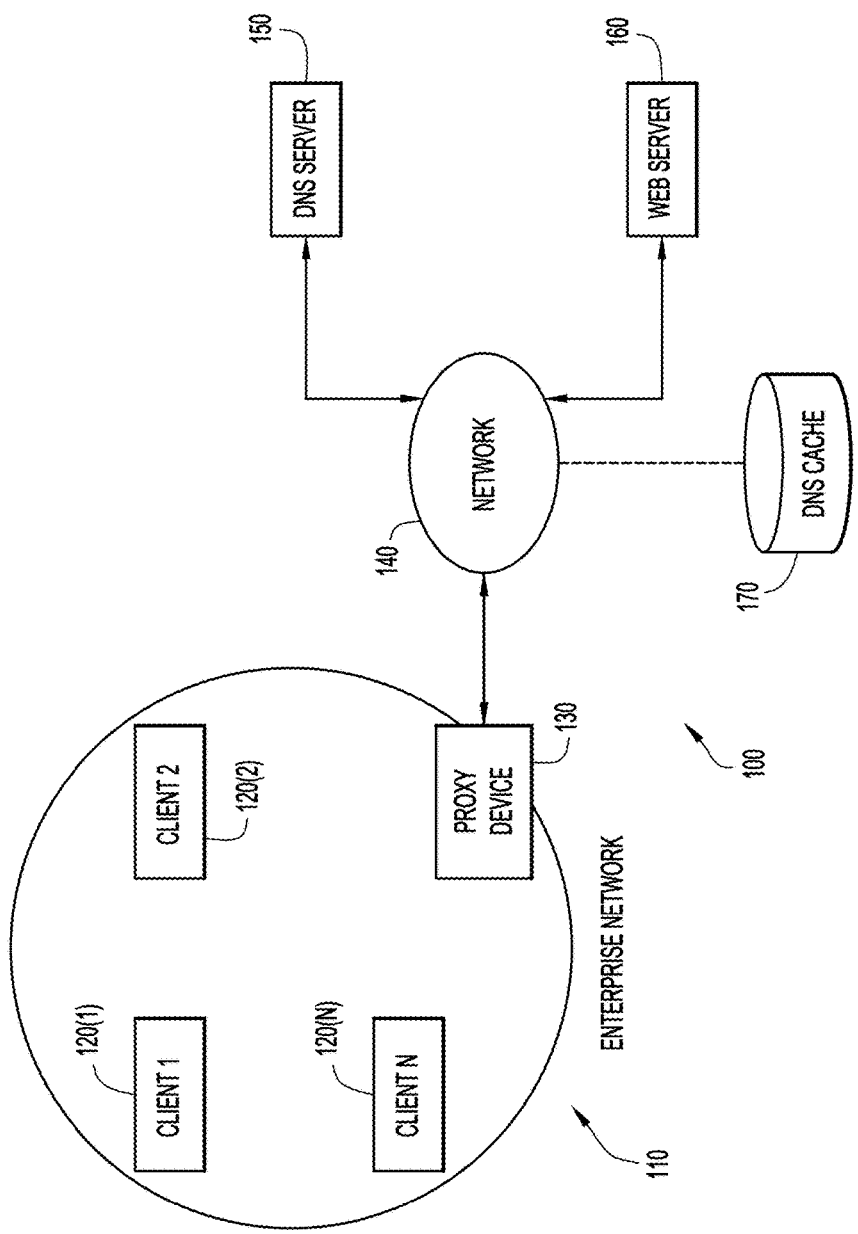
FIG. 1 is a schematic block diagram of an environment for applying policies to a connection request message based on the comparison of the server name identification and Internet Protocol (IP) address of the connection request message with cached DNS results, according to an example embodiment.

An example embodiment of a system 100 configured to verify the server name presented in a connection request message is depicted in FIG. 1. The system 100 includes an enterprise network 110, which further contains a plurality of clients 120(1)-120(N), where N represents the number of clients in the enterprise network 110. The enterprise network 110 further includes a proxy device 130 deployed, for example, at the edge of the enterprise network 110. As illustrated, the proxy device 130 is connected to a network 140, and is in communication with the clients 120(1)-120(N) of the enterprise network 110. Thus, the clients 120(1)-120(N) of the enterprise network 110 access the network 140 through the proxy device 130. The proxy device 130 is configured to monitor, control, and filter the incoming and outgoing network traffic of the clients 120(1)-120(N) of the enterprise network 110. As further illustrated in FIG. 1, the system 100 further includes a domain name system (DNS) server 150 and a web server 160. Both the DNS server 150 and the web server 160 are connected with the network 140. The DNS server 150 is a server, or network of servers, that translates domain name queries from clients into Internet Protocol (IP) addresses. The web server 160 is a device that delivers web content via an IP address and a domain name. The system 100 further includes a DNS cache 170. The DNS cache 170 may be located in the cloud, locally on the proxy device 130, or on an external device coupled to the proxy device 130. The DNS cache 170 may be a repository that stores domain names and associated IP addresses collected by the proxy device 130 from DNS queries sent by the clients 120(1)-120(N) and/or responses received from the DNS server 150.

Moreover, the networks 110, 140 may include, without limitation, any one or more of local or wide area networks, Internet Protocol (IP) networks such as intranet or internet networks, telephone networks (e.g., public switched telephone networks), wireless or mobile phone or cellular networks, and any suitable combinations thereof. The number of clients 120(1)-120(N) depicted in the enterprise network 110 in FIG. 1 is for example purposes only, and it is noted that the enterprise network 110 connecting the clients 120(1)-120(N) and proxy device 130 can support communications and exchange of data between any number of clients, and proxy devices. It is further noted that the network 140 connecting the proxy device 130 of the enterprise network 110, and ultimately the clients 120(1)-120(N), with the DNS server 150, web server 160, and DNS cache 170 can support communications and exchange of data between any number of clients, proxy devices, DNS servers, web servers, and DNS caches.

Some examples of clients 120(1)-120(N) include any type of computing device including, without limitation, personal computer (PC) devices, such as stationary (e.g., desktop) computers, laptop computers, or any other type of mobile computing device such as cellular (smart) mobile phones (e.g., cell phones, also referred to as mobile phones), note pads, tablets, personal data assistant (PDA) devices, and other portable media devices. The clients 120(1)-120(N), proxy device 130, DNS server 150, web server 160, and other devices of the system 100 can utilize any suitable operating system to transfer data between the clients 120(1)-120(N), proxy device 130, DNS server 150, web server 160, and DNS cache 170. In addition, the techniques described herein for verifying the server name of a connection request message from clients 120(1)-120(N) of an enterprise network 110 can be integrated with any suitable type of commercial software products.

Figure 2:
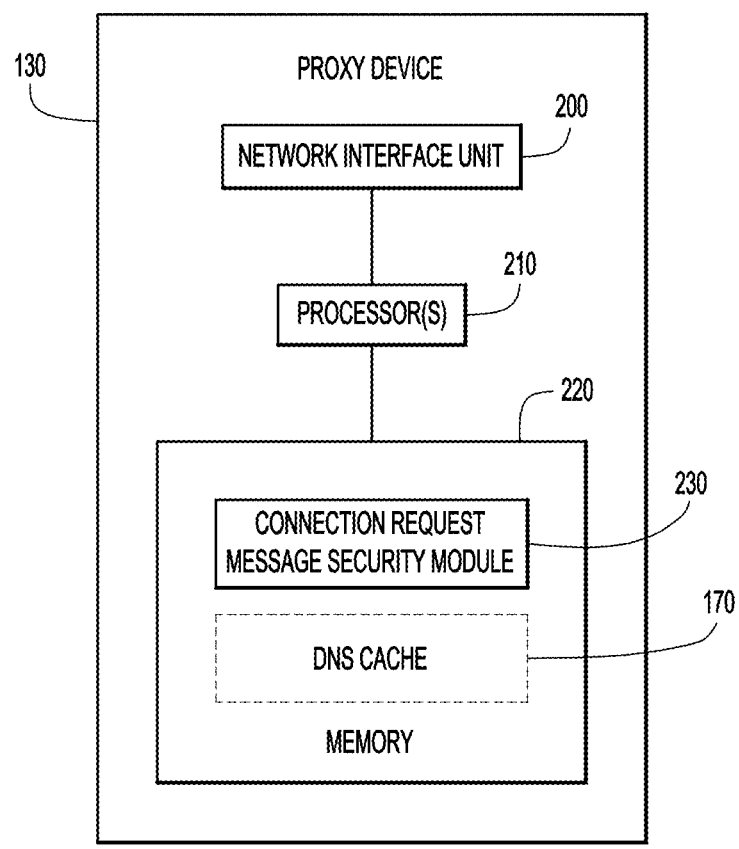
FIG. 2 is a block diagram of a proxy device illustrated in FIG. 1, wherein the proxy device is configured to verify the server name identification of connection request messages and apply policies to the connection request messages upon verification, in accordance with an example embodiment.

Illustrated in FIG. 2 is an example block diagram of the proxy device 130 of the enterprise network 110. The proxy device 130 may be configured to perform the techniques presented herein. The proxy device 130 includes a network interface unit 200, a processor(s) 210, and a memory 220. The network interface unit 200 is configured to enable network communications over networks and may include a plurality of ports at which it can receive incoming network traffic and from which it can send outgoing network traffic. While conceptually illustrated as a "network interface unit," it will be appreciated that a physical device may contain more than one network interface unit or type of interface to communicate with other devices within a network. For example, network interface unit 200 may include a wireless network interface unit to facilitate wireless communication over enterprise network 110 or network 140 illustrated in FIG. 1.

The processor(s) 210 may be embodied by one or more microprocessors or microcontrollers, and executes software instructions stored in memory 220 for the connection request message security module 230 in accordance with the techniques presented herein in connection with FIGS. 1 and 3-6. When the DNS cache 170 is located locally on the proxy device 130, the DNS cache 170 is also stored in memory 220, where the processor(s) 210 may store data and access the stored data in the DNS cache 170.

Memory 220 may include one or more computer readable storage media that may comprise read only memory (ROM), random access memory (RAM), magnetic disk storage media devices, optical storage media devices, flash memory devices, electrical, optical, or other physical/tangible memory storage devices.

Thus, in general, the memory 220 may comprise one or more tangible (e.g., non-transitory) computer readable storage media (e.g., a memory device) encoded with software comprising computer executable instructions, and when the software is executed by the processor(s) 210, the processor(s) 210 is operable to perform the operations described herein by executing instructions associated with the connection request message security module 230 and the DNS cache 170. In other approaches, and as previously described, connection request message security module 230 and DNS cache 170 are stored remotely, external to the proxy device 130, but accessible by the processor(s) 210. The connection request message security module 130 enables the proxy device 130 to obtain and collect data (e.g., requested domain names, IP addresses associated with the requested domain names, IP addresses of the clients 120(1)-120(N) of the enterprise network 110, etc.) of the DNS queries sent by the clients 120(1)-120(N) of the enterprise network 110 and the DNS results sent by the DNS server 150 in response to the DNS queries, and store that data within the DNS cache 170. Moreover, as explained in further detail below, the connection request message security module 230 enables the proxy device 130 to then compare the information of a connection request message 330 sent from one of the clients 120(1)-120(N) of the enterprise network 110 to the web server 160 with the data stored in the DNS cache 170 to determine what security policies to apply to the connection request message. In addition, as explained in further detail below, the DNS cache 170 is a repository that stores the domain names and associated IP addresses collected by the proxy device 130.

The functions of the processor(s) 210 may be implemented by logic encoded in one or more tangible computer readable storage media or devices (e.g., storage devices compact discs, digital video discs, flash memory drives, etc. and embedded logic such as an ASIC, digital signal processor instructions, software that is executed by a processor, etc.).

While FIG. 2 shows that the proxy device 130 may be embodied as a dedicated physical device, it should be understand that the functions of the proxy device 130 may be embodied as software running in a data center/cloud computing system, together with numerous other software applications.

Figure 3:
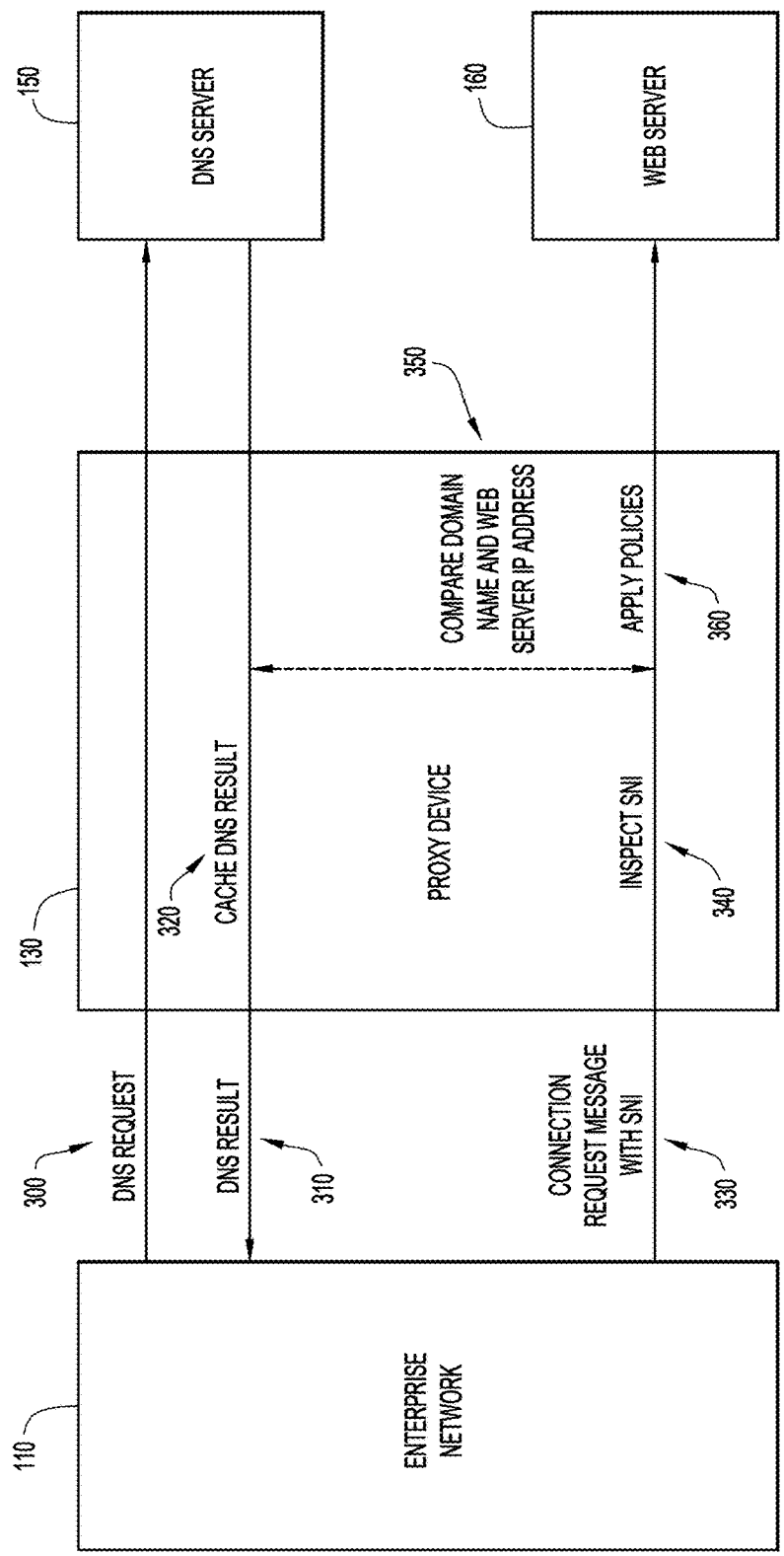
FIG. 3 is a sequence diagram illustrating the operational flow according to an example embodiment.

FIG. 3 illustrates a sequence diagram that depicts the traffic monitored and analyzed by the proxy device 130. Reference is also made to FIGS. 1 and 2 for purposes of the description of FIG. 3. As previously explained, the connection request message security module 230 is configured to enable the proxy device 130 to obtain and collect data of the DNS queries sent by the clients 120(1)-120(N) of the enterprise network 110 and the DNS results sent by the DNS server 150 in response to the DNS queries, and store that data within the DNS cache 170. As illustrated in FIG. 3, at least one DNS request or DNS query 300 is sent from the enterprise network 110 to the DNS server 150 via the proxy device 130. The DNS requests 300 may have originated from one of the clients 120(1)-120(N) of the enterprise network 110. DNS requests 300 are often originated by software (e.g., a web browser, etc.) installed on the clients 120(1)-120(N) when the user of the client 120(1)-120(N) wishes to obtain web content. The proxy device 130 is configured to transmit multiple DNS requests 300 from the numerous clients 120(1)-120(N) of the enterprise network 110. As the proxy device 130 relays the DNS request 300 to the DNS server 150, the proxy device 130 may obtain both the requested domain name and the IP address of the client that sent the request, from the DNS request 300.

As further illustrated, in response to each DNS request 300 received, the DNS server 150 sends a DNS result or DNS response 310 back to the client 120(1)-120(N) of the enterprise network 110 that originated the DNS request 300. The DNS result 310 is transmitted from the DNS server 150 to the client 120(1)-120(N) of the enterprise network 110 through the proxy device 130. The DNS result 310 may include the requested domain name of the DNS request 300, the IP address of the web server 160 associated the requested domain name, and the IP address of the client 120(1)-120(N) that originated the DNS request 300. As the proxy device 130 relays each of the DNS results 310 to the enterprise network 110, the proxy device 130 caches the DNS results 320. When caching the DNS results 320, the proxy device 130 may cache the requested domain name of the DNS request 300, the IP address of the web server associated the requested domain name according to the DNS server 150, and the source IP address of the client 120(1)-120(N) that originated the DNS request 300. As previously explained, the proxy device 130 may store the cached data from the DNS result 310 in a DNS cache 170 that is located either locally, in the cloud, or on an external device coupled to the proxy device 130. In addition, the proxy device 130 may store the cached data in the DNS cache 170 for a predetermined amount of time. After the predetermined amount of time has expired, the cached data may be deleted or removed from the DNS cache 170. The predetermined amount of time may be of any length of time. In addition, the DNS cache may be updated for each new DNS request 300 and DNS result 310 that are captured by the proxy device 130.

After caching a DNS result, and within the predetermined amount of time, at least one of the clients 120(1)-120(N) from the enterprise network 110 may attempt to establish a connection with a web server 160 of a domain name by sending a connection request message 330 to the web server 160. The connection request message 330 may be sent from a client 120(1)-120(N) of the enterprise network 110 to the web server 160 via the proxy device 130. The connection request message 330 may be a Transport Layer Security (TLS) client hello message with a server name identification (SNI) extension. More specifically, the connection request message may be a TLS version 1.2 client hello message with an SNI extension. When the proxy device 130 receives the connection request message 330, the proxy device 130 may inspect 340 the connection request message 330. More specifically, at 340, the proxy device 130 may inspect the IP address listed in the connection request message 330 as well as the server name or domain name listed in the SNI extension of the connection request message 330. Once the proxy device 130 determines the IP address and server name listed in the connection request message 330, at 350, the proxy device 130 compares the IP address and server name listed in the connection request message 330 to the domain names and associated IP addresses stored in the DNS cache 170. In comparing, the proxy device 130 utilizes the IP address of the web server 160 listed in the connection request message 330 to look up a previously cached DNS result 320. The connection request message 330 does not have to originate from the same client 120(1)-120(N) of the enterprise network 110 from which the previously cached DNS request 320 originated. The proxy device 130 retrieves, from the previously cached DNS results 320, the domain name that the DNS server 150 associated with the IP address used to look up the cached DNS result 320. The proxy device 130 then determines whether or not the domain name of the cached DNS result 320 matches the server name listed in the SNI extension of the connection request message 330.

After comparing the connection request message 330 with the DNS results 320, at 360, the proxy device 130 applies policies to the connection request message 330 based on whether or not the server name listed in the SNI extension of the connection request message 330 matches the domain name of the cached DNS result 320. For example, if, the server name in the SNI extension of the connection request message 330 matches the domain name, then the proxy device 130 may allow the connection request message to be sent to the web server 160 identified in the connection request message 330. Conversely, if the server name in the SNI extension of the connection request message 330 does not match the domain name, then the proxy device 130 may decline the connection between the client 120(1)-120(N) and the web server 160. The proxy device 130 may, however, apply other policies to the connection request message 330 and the connection between the web server 160 and the client when the server name in the SNI extension of the connection request message 330 does not match the cached domain name, such as decryption or a deeper inspection of the message 330 or the connection. If the proxy device 130 allows the connection request message 330 to be sent to the web server 160, the proxy device 130 may perform a further verification step, where the proxy device 130 also verifies the cached domain name with the server side certificate sent by the web server 160 when establishing a connection. The proxy device 130 may decline the connection between the client 120(1)-120(N) and the web server 160 if the cached domain name is not presented in the server side certificate, but may allow the connection if the cached domain name is presented in the server side certificate. For example, a network administrator may have a policy to block traffic to a particular website, and without the techniques presented herein, a client may subvert the policy. A normal (non-malicious client) will catch this issue because there would be a hostname mismatch. However, a malicious client that may deliberately generate a message using an IP address (otherwise known to be acceptable) but use it to seek a connection with a particular webserver (that is not associated with that IP address) for malicious purposes.

As previously explained, the DNS cache 170 may be located locally on the proxy device 130, stored on an external device of the proxy device 130, or may be cloud-based. The DNS cache 170 may be stored on an external device of the proxy device 130 when there are resource constraints on the proxy device 130. In the event the DNS cache 170 is located on an external device of the proxy device 130 or is cloud-based, the proxy device 130 will need to send the data of the DNS results 320 to the device or entity containing the DNS cache 170 so that the data of the DNS results 320 is stored in the DNS cache 170. Moreover, when comparing the domain name and web server IP address of the connection request message 330 with the cached DNS results 320, the proxy device 130 may request the necessary information from the external device or a cloud computing system before applying any policies to the connection request message 330. Furthermore, a hybrid approach may be performed by the proxy device 130, where a partial DNS cache 170 is stored locally to the proxy device 130, and the remaining DNS cache 170 is stored on an external device of the proxy device 130 and/or a cloud computing system.

Figure 4:
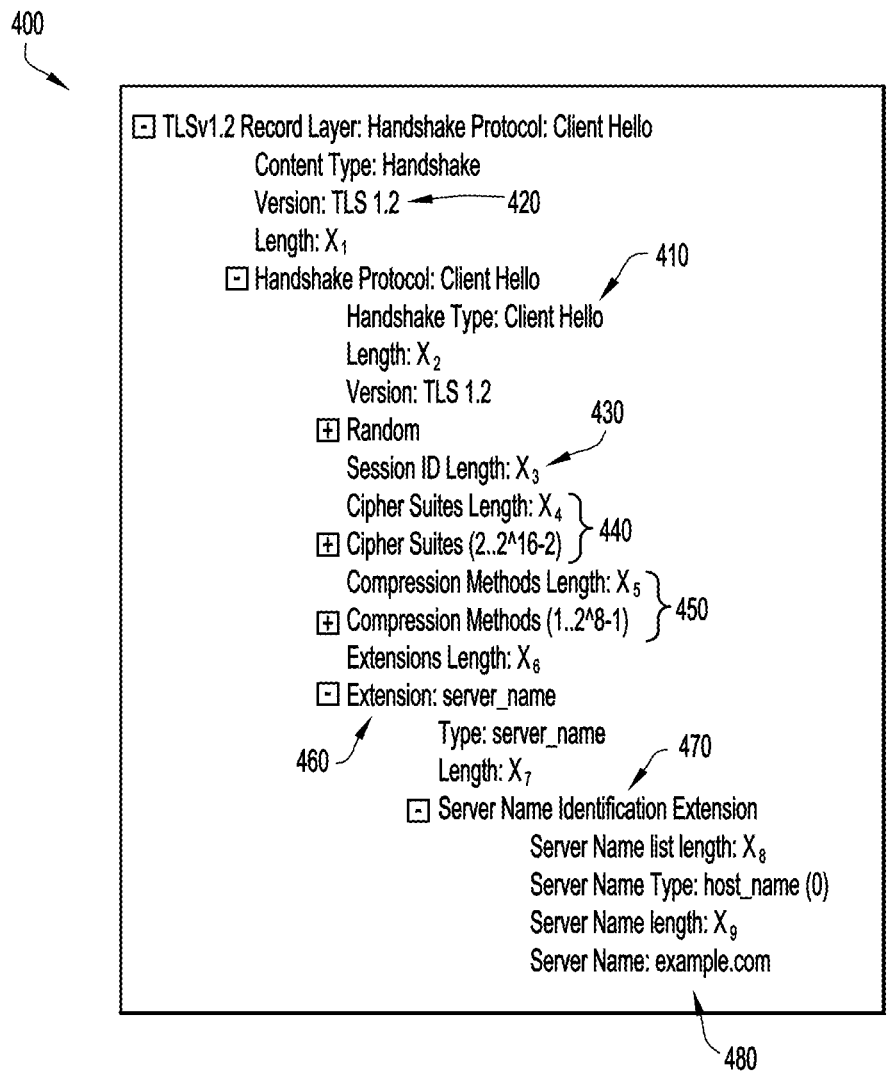
FIG. 4 is a packet capture of an example connection request message according to an example embodiment.

FIG. 4 illustrates a packet capture 400 of an example connection request message. More specifically, FIG. 4 illustrates a packet 400 for a TLS version 1.2 client hello message, as indicated at reference numerals 410 and 420. Reference is also made to FIGS. 1-3 for purposes of the description of FIG. 4. The session ID is shown at 430, and this is the identification of the session the client wishes to use for this connection with the web server 160. Typically, for the first client hello message of the exchange between the client and the web server 160, the session ID is empty or null. In this instance, $X_3$ would typically equal zero. The cipher suite is indicated at reference numeral 440. The cipher suite 440 contains the combinations of cryptographic algorithms supported by the client in order of the client's preference (first cipher suite listed is the client's most preferred). Each of the cipher suites listed may define both a key exchange algorithm and a cipher specification. If the web server 160 receives the connection request message 330, the web server selects a cipher suite or, if no acceptable choices are presented, returns a handshake failure alert and closes the connection.

Still referring to FIG. 4, the compression methods supported by the client are indicated at reference numeral 450. In some instances, the compression methods 450 may be null. At 460 is the list of extensions of the connection request message 330. A connection request message 330 may contain any number of extensions 460. As illustrated in FIG. 4, the only extension 460 listed in this connection request message 330 is the SNI extension 470. In the example of FIG. 4, the indicated server name, at 480, in the SNI extension 470 is "example.com." As explained previously, the SNI extension may be manipulated by the client prior to sending the connection request message. The proxy device 130, upon receiving the connection request message 330 from a client 120(1)-120(N) of an enterprise network 110, compares the server name 480 listed in the SNI extension of the connection request message 330 with the cached DNS result 320 to determine which policies to apply to the connection request message 330.

Turning now to FIG. 5, an example code structure 500 of the connection request message 330 is shown. At 510 of the code structure 500 are the lines of code that determine what type of handshake message the message is, such as a client hello message. The code 510 may also be used to indicate what security protocol (e.g., TLS version 1.2) to use for the connection between the client 120(1)-120(N) and the web server 160. The code 520 may indicate the session ID of the connection request message. The code at 530 may indicate the cipher suites that are supported by the client. The code at 540 may indicate the compression methods supported by the client. Finally, the code 550 may indicate the location of the code structure 500 where the various types of extensions may be listed for the connection request message. Further illustrated in FIG. 5, at 560, is code that represents the SNI extension of the packet. For a connection request message with malicious intent, code 560 may be altered in an attempt to trick the proxy device 130 to allow a connection between a client and a web server 160 that would typically be blocked by the proxy device 130.

Figure 6:
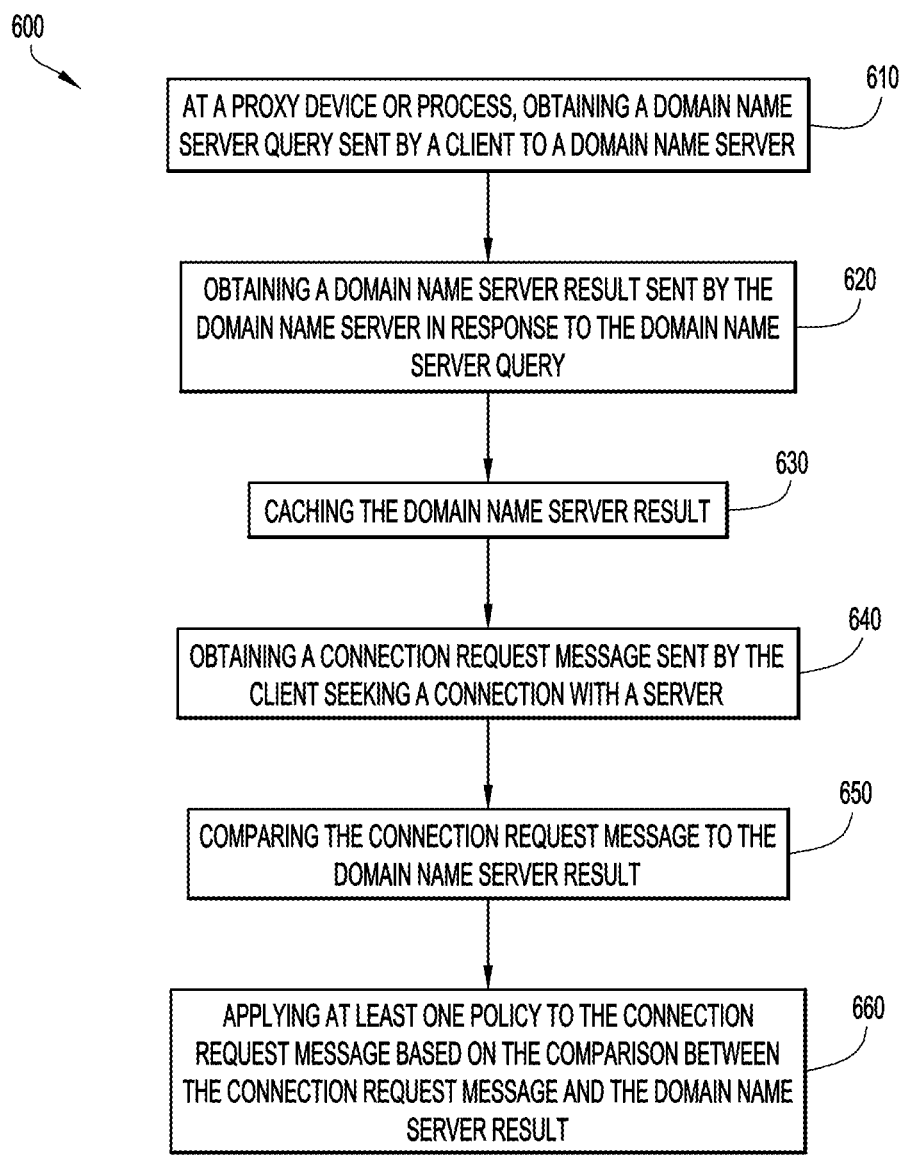
FIG. 6 is a flowchart depicting a process for verifying the server name identification of connection request messages and applying policies based on the server name identification verification, according to an example embodiment.

An example embodiment of a process 600 performed by the proxy device 130 for verifying that the connection request message from a client contains a server name that matches the web server 160 located at the IP address indicated within the connection request message 330 is depicted by the flowchart of FIG. 6. Reference is also made to FIGS. 1-5 for purposes of the description of FIG. 6. At 610, the proxy device 130, which is located on the edge of an enterprise network 110 and in communication with a plurality of clients 120(1)-120(N), obtains a domain name server query 310 that is sent by a client 120(1)-120(N) to a domain name server 150. As previously explained, when attempting to access a website or webpage, the client first sends a DNS request or query 300 to the DNS server 150 to obtain the IP address of the web server 160 associated with the requested domain name. The communication between the DNS server 150 and the client is facilitated by the proxy device 130. At 620, the proxy device 130 obtains the domain name server result 310 that is sent by the DNS server 150 to the client in response to receiving the DNS request 300. The DNS result 310 may contain the requested domain name, the IP address of the web server 160 associated with the requested domain name, and the source IP address of the client that originated the DNS request 300. The proxy device 130, at 630, caches the data of the DNS result 310 and stores the cached DNS result 320 in the DNS cache 170. Within a predetermined period of time of caching the DNS result, the proxy device 130, at 640, then obtains a connection request message 330 from a client seeking a connection with a web server 160. As previously explained, the connection request message 330 may be a TLS version 1.2 client hello message, and may include the web server 160 IP address and a server name. At 650, the proxy device 130 compares the connection request message 330 with the cached DNS result 320. More specifically, the proxy device 130 uses the IP address of the connection request message 330 to look up the associated domain name in the cached DNS results 320. Once determining the associated domain name, the proxy device 130 compares the associated domain name from the cached DNS results 320 with the server name of the connection request message 330. Finally, at 660, based on the comparison between the server name of the connection request message 330 and the domain name from the cached DNS results 320, the proxy device 130 applies at least one policy on how to handle the connection request message 330. As previously explained, the proxy device 130 may allow the connection if the server name matches the domain name, and may disallow the connection if the server name does not match the domain name.

As previously explained, the DNS result may include the domain name that was queried by the domain name server query and the corresponding first IP address. Furthermore, the connection request message may include a server name and a second IP address, wherein the second IP address is the address of the web server to which the client wishes to connect. Furthermore, when the proxy device, at 650, compares the connection request message with the cached DNS result, the proxy device 130 matches the second IP address with the first IP address of the cached DNS result to look up the domain name associated with the first IP address of the cached DNS result. The proxy device 130 compares the listed domain name of the first IP address, according to the cached DNS result, to the server name listed in the connection request message to determine whether the server name matches the domain name. When the server name does not match the domain name, the proxy device 130, in applying at least one policy at 660, disallows the connection between the client and the web server 160. Conversely, when the server name does match the domain name, the proxy device 130, in applying at least one policy at 660, allows the connection between the client and the web server 160. The comparison between the domain name connection request message and the cached DNS results may be performed when the connection request message is received by the proxy device 130 within a predetermined time interval that the domain name server query is received. The connection request message sent by the client may be a Transport Layer Security client hello message with an SNI extension. Furthermore, when the proxy device 130, at 650, compares the connection request message to the cached DNS results, the proxy device 130 compares the content of an SNI field or extension of the client hello message and the destination IP address of the client hello message with the cached DNS result. In addition, the domain name cache may be local to the proxy device 130 or process, or may be cloud-based.

The techniques presented herein provide a method of verifying that the server name listed in the SNI extension of a connection request message is the name of the server at the IP address listed in the connection request message. By verifying the server name listed in the connection request message, the proxy device is able to apply security policies to the connection request messages to properly prevent malicious traffic from entering an enterprise network. Without verifying the server name of the SNI extension of a connection request message, a proxy device may be tricked into allowing a client of the enterprise network to establish a connection with a web server that would normally be blocked by the proxy device, and thus allowing malicious traffic into the enterprise network. In addition, without verifying the server name of the SNI extension of a connection request message, the proxy device may not be able to determine the actual domain that the connection message goes to without performing some type of decryption. By verifying the server name of the SNI extension of a connection request message, the proxy device may more adequately apply security policies to keep the clients of the enterprise network secure from malicious traffic.

In another form, an apparatus is provided comprising a network interface unit configured to network communications, including communication with a plurality of clients of an enterprise network, a DNS server, a web server, and a DNS cache; a memory; and a processor configured to: obtain a domain name server query sent by a client to a domain name server, obtain a domain name server result sent by the domain name server in response to the domain name server query, cache the domain name server result, obtain a connection request message sent by the client seeking a connection with a server, compare the connection request message to the domain name server, and apply at least one policy to the connection request message based on the comparison between the connection request message and the domain name server result.

In still another form, one or more non-transitory computer readable storage media are provided for a server in communication with a plurality of clients of an enterprise network, a DNS server, a web server, and a DNS cache, the computer readable storage media being encoded with software comprising computer executable instructions, and when the software is executed, operable to: obtain a domain name server query sent by a client to a domain name server, obtain a domain name server result sent by the domain name server in response to the domain name server query, cache the domain name server result, obtain a connection request message sent by the client seeking a connection with a server, compare the connection request message to the domain name server, and apply at least one policy to the connection request message based on the comparison between the connection request message and the domain name server result.

The above description is intended by way of example only. Various modifications and structural changes may be made therein without departing from the scope of the concepts described herein and within the scope and range of equivalents of the claims.

What is claimed is:

1. A method comprising:

obtaining, by a proxy device of an enterprise network, a domain name server query sent by a client located within the enterprise network to a domain name server located outside of the enterprise network;

obtaining, by the proxy device, a domain name server result sent by the domain name server in response to the domain name server query, the domain name server result including a domain name queried by the domain name server query and a corresponding first Internet Protocol (IP) address;

caching, by the proxy device, the domain name server result in a domain name cache;

obtaining, by the proxy device, a connection request message sent by the client seeking a connection with a server located outside of the enterprise network, the connection request message including a server name and a second IP address;

comparing, by the proxy device, the connection request message to the domain name server result to detect if the client within the enterprise network altered the server name of the connection request message in an attempt to deceive the proxy device to enable malicious network traffic to enter the enterprise network through the proxy device, wherein comparing includes determining, when the second IP address matches the first IP address, whether the server name matches the domain name; and applying, by the proxy device, one or more policies to the connection request message based on whether or not the client altered the server name in the connection request message, the one or more policies including establishing a connection between the client and the server when the server name matches the domain name or disallowing the connection between the client and the server when the server name does not match the domain name.

2. The method of claim 1, wherein the comparing is performed when the connection request message from the client is received within a predetermined time interval from which the domain name server query is received from the client.

3. The method of claim 1, wherein the connection request message is a Transport Layer Security client hello message, and the comparing comprises comparing content of a server name identification field of the client hello message and destination address of the client hello message with the domain name server result.

4. The method of claim 1, wherein the domain name cache is local to the proxy device, or is cloud-based.

5. The method of claim 1, wherein the domain name server query includes the domain name and a third IP address, the third IP address being an IP address of the client within the enterprise network.

6. The method of claim 5, wherein the domain name server result further includes the third IP address.

7. The method of claim 1, further comprising:

verifying the domain name with a server side certificate received from the server when establishing the connection between the client and the server.

8. An apparatus comprising:
a network interface unit configured to enable network communications;
a memory; and
a processor configured to:
obtain a domain name server query sent by a client located within an enterprise network to a domain name server located outside of the enterprise network,
obtain a domain name server result sent by the domain name server in response to the domain name server query, wherein the domain name server result includes a domain name queried by the domain name server query and a corresponding first Internet Protocol (IP) address,
cache the domain name server result in a domain name cache,
obtain a connection request message sent by the client seeking a connection with a server located outside of the enterprise network, the connection request message including a server name and a second IP address,
compare the connection request message to the domain name server result to detect if the client within the enterprise network altered the server name of the connection request message in an attempt to deceive the apparatus to enable malicious network traffic to enter the enterprise network through the apparatus, wherein the compare includes determining, when the second IP address matches the first IP address, whether the server name matches the domain name, and
apply one or more policies to the connection request message based on whether or not the client altered the server name in the connection request message, the one or more policies including establishing a connection between the client and the server when the server name matches the domain name or disallowing the connection between the client and the server when the server name does not match the domain name.

9. The apparatus of claim 8, wherein the comparing is performed when the connection request message from the client is received within a predetermined time interval from which the domain name server query is received from the client.

10. The apparatus of claim 8, wherein the connection request message is a Transport Layer Security client hello message, and the compare comprises comparing content of a server name identification field of the client hello message and destination address of the client hello message with the domain name server result.

11. The apparatus of claim 8, wherein the domain name cache is local to the proxy device or is cloud-based.

12. The apparatus of claim 8, wherein the domain name server query includes the domain name and a third IP address, the third IP address being an IP address of the client within the enterprise network.

13. The apparatus of claim 12, wherein the domain name server result further includes the third IP address.

14. The apparatus of claim 8, wherein the processor is further configured to:
verify the domain name with a server side certificate received from the server when establishing the connection between the client and the server.

15. One or more non-transitory computer readable storage media of a proxy server in communication with user devices of an enterprise network, the computer readable storage media being encoded with software comprising computer executable instructions, and when the software is executed, operable to:
obtain a domain name server query sent by a client located within the enterprise network to a domain name server located outside of the enterprise network;
obtain a domain name server result sent by the domain name server in response to the domain name server query, the domain name server result including a domain name queried by the domain name server query and a corresponding first Internet Protocol (IP) address;
cache the domain name server result in a domain name cache;
obtain a connection request message sent by the client seeking a connection with a server located outside of the enterprise network, the connection request message including a server name and a second IP address;
compare the connection request message to the domain name server result to detect if the client within the enterprise network altered the server name of the connection request message in an attempt to deceive the proxy server to enable malicious network traffic to enter the enterprise network through the proxy server, wherein the compare includes determining, when the second IP address matches the first IP address, whether the server name matches the domain name; and
apply one or more policies to the connection request message based on whether or not the client altered the server name in the connection request message, the one or more policies including establishing a connection between the client and the server when the server name matches the domain name or disallowing the connection between the client and the server when the server name does not match the domain name.

16. The computer readable storage media of claim 15, wherein the comparing is performed when the connection request message from the client is received within a predetermined time interval from which the domain name server query is received from the client.

17. The computer readable storage media of claim 15, wherein the connection request message is a Transport Layer Security client hello message, and the compare comprises comparing content of a server name identification field of the client hello message and destination address of the client hello message with the domain name server result.

18. The computer readable storage media of claim 15, wherein the domain name cache is local to the proxy device or is cloud-based.

19. The computer readable storage media of claim 15, wherein the domain name server query includes the domain name and a third IP address, the third IP address being an IP address of the client within the enterprise network.

20. The computer readable storage media of claim 19, wherein the domain name server result further includes the third IP address.

* * * * *